United States Patent [19]

Scholl et al.

[11] 4,264,214
[45] Apr. 28, 1981

[54] GEAR MOTOR/MIXER

[75] Inventors: Charles H. Scholl; Larry Akers, both of Vermilion, Ohio

[73] Assignee: Nordson Corporation, Amherst, Ohio

[21] Appl. No.: 914,159

[22] Filed: Jun. 9, 1978

[51] Int. Cl.³ .......................... B01F 13/02; B01F 5/14
[52] U.S. Cl. ................................... 366/103; 366/272; 366/280
[58] Field of Search ............... 366/272, 280, 101, 102, 366/103; 261/28, 84; 418/15, 9, 25, 28, 205, 206; 417/348

[56] References Cited

U.S. PATENT DOCUMENTS

| | | |
|---|---|---|
| Re. 27,865 | 1/1974 | Baker . |
| 1,114,985 | 10/1914 | Heinsen . |
| 2,768,405 | 10/1956 | Mineah . |
| 3,053,457 | 9/1962 | Trumbull . |
| 3,179,383 | 4/1965 | Knedlik ............................... 366/272 |
| 3,488,699 | 1/1970 | Lee ....................................... 366/272 |
| 3,628,893 | 12/1971 | Carpigiani ............................ 418/15 |
| 3,965,860 | 6/1976 | Cone . |
| 4,015,828 | 4/1977 | Miles .................................... 366/272 |
| 4,059,714 | 11/1977 | Scholl . |

FOREIGN PATENT DOCUMENTS

2104527 9/1971 Netherlands .

*Primary Examiner*—Robert W. Jenkins
*Attorney, Agent, or Firm*—Wood, Herron & Evans

[57] ABSTRACT

A gas/liquid mixer in which intermeshing gears are caused to rotate and establish mixing, by pressure of the fluids being mixed. The gears are mounted for rotation in a gear chamber and interengage in a meshing zone of the chamber. A gas is introduced into the chamber through a gas inlet which is adjacent to one end of the meshing zone. A liquid inlet enters the chamber between the gas inlet and an outlet which is positioned adjacent a second or opposite end of the mixing zone. The gears are rotated in the chamber by the introduction and expansion of the gas and liquid in the spaces between the gear teeth. Flow regulating means controls the gas/liquid ratio. The apparatus is useful, among other purposes, for mixing a soluble gas with molten hot melt adhesive, directly adjacent the nozzle of a dispenser for preparing a hot melt foam.

25 Claims, 6 Drawing Figures

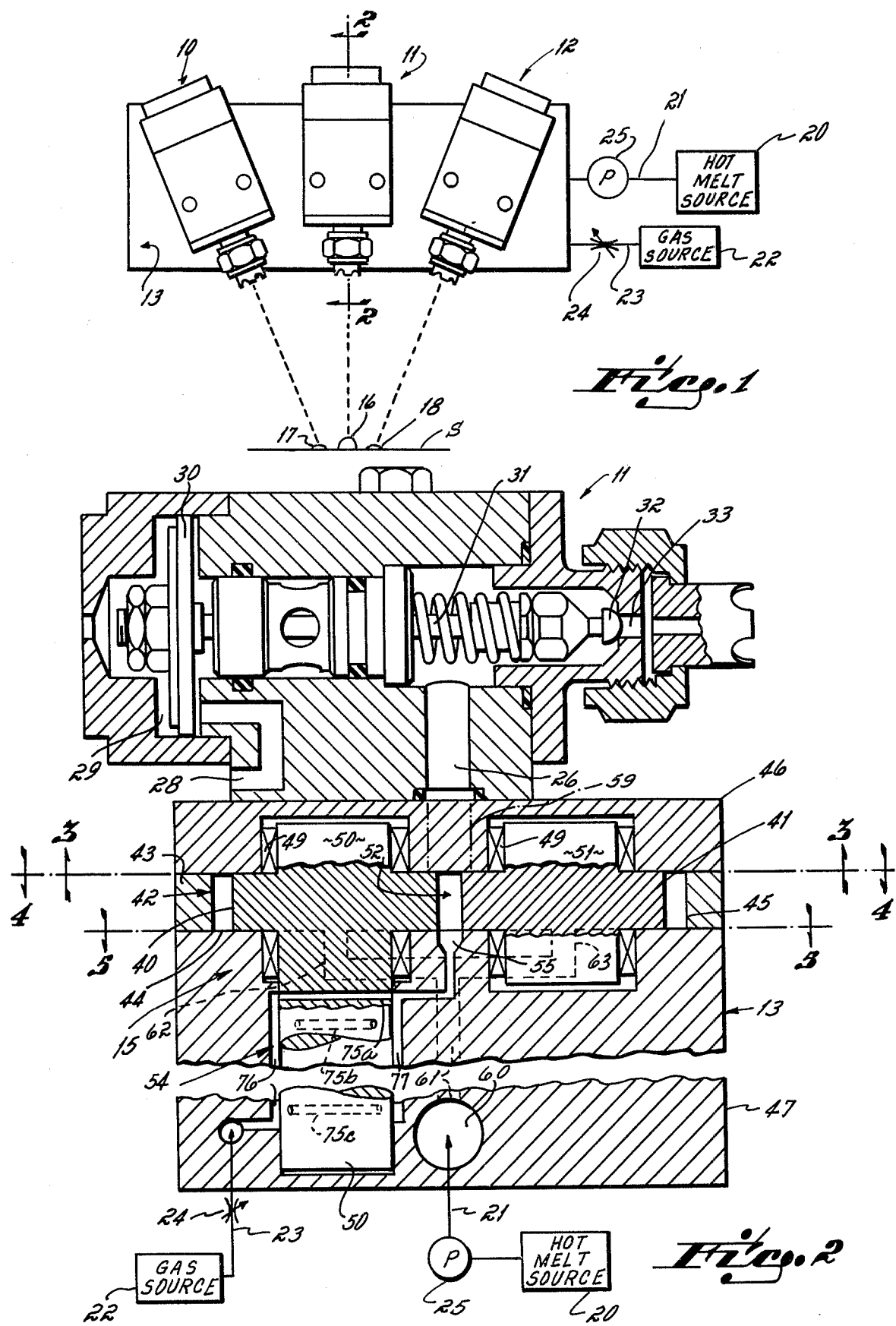

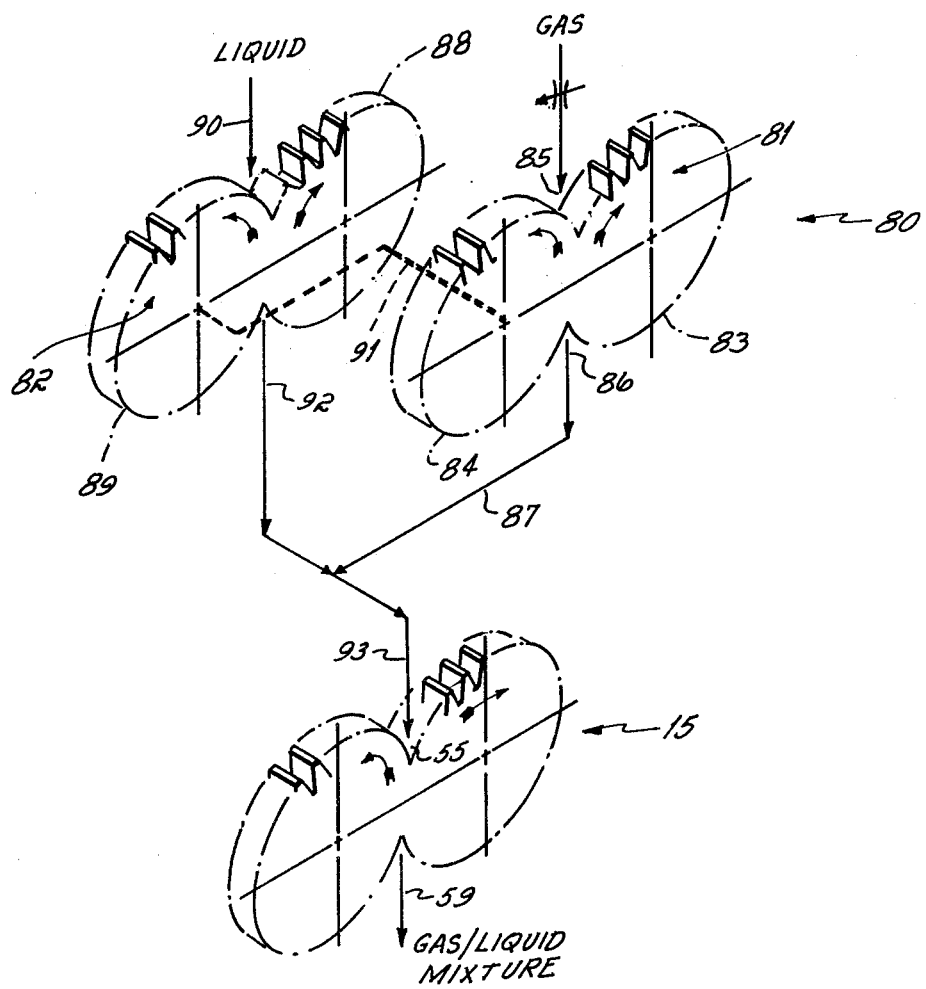

GEAR MOTOR/MIXER

FIELD OF THE INVENTION

This invention relates to devices for mixing two fluids under pressure, and more particularly to a device wherein the mixing is accomplished by the meshing of gear teeth in a gear motor driven by pressure of the incoming fluid.

THE PRIOR ART

In U.S. Pat. No. 4,059,714, of which one of the present applicants is a co-inventor and which is assigned to the same assignee as this application, there is disclosed a gear pump for dispersing a gas into a liquid. Both single and double stage gear pumps are taught in the patent, using intermeshed pairs of external gears enclosed in pumping chambers. The gears are driven through a drive shaft connected to a prime mover such as an air motor. In the single stage embodiment, the liquid material (which can be a molten hot melt adhesive) is introduced to the pumping chamber through a liquid inlet which is located between the two gears, where the teeth are just coming out of engagement as they are rotated by the motor drive. Two gas inlets are provided, one for each of the two gear lobes of the pumping chamber. Each gas inlet enters its respective lobe in the pumping chamber at a position spaced downstream (i.e., in the direction of gear rotation) from the liquid inlet and separated from the liquid inlet by one or more gear teeth. The gas and liquid are received in the spaces between the teeth of the respective gears, carried in those spaces around the periphery of the pumping chamber as the gears rotate, and delivered to an outlet where the teeth are again coming into mesh. As the tooth of one gear moves into an intertooth space of the opposite gear, the fluid in that space is positively displaced from it to the outlet. The gas is forced into what is believed to be a true solution in the liquid. The gas/liquid solution or mixture, under pump outlet pressure, is delivered from the outlet of the pumping chamber to a dispenser from which it can be selectively dispensed or released to atmospheric pressure. Upon such release the gas dispersed in the liquid volatilizes to create a foam.

In our copending application Ser. No. 874,333, filed Feb. 1, 1978, now U.S. Pat. No. 4,200,207, entitled "Hot Melt Adhesive Foam Pump System," which is assigned to the same assignee as this application, there is described an improved two-stage gear pump system in which the first stage pump is a liquid metering pump for delivering hot melt adhesive liquid at a constant rate to a second stage pump. The gas is added in the second stage, to the liquid supplied from the first stage. In the second stage, the liquid and gas are introduced through separate spaced ports, the liquid inlet port being upstream from the respective gas inlet port, there being a gas inlet in each of the two lobes of the pumping chamber. The application explains that the sequence of first admitting the liquid into the respective gear tooth space, then subsequently filling the remaining volume of the respective intertooth space with the gas, helps insure that each space receives liquid and gas in the desired ratio. If the space were first filled with gas, then the compressibility of the gas could result in the "bubble" that would resist entry of the liquid into that space or might lead to a higher or different gas/liquid ratio and resultant variations in foam density.

In the copending application of Hamilton et al, Ser. No. 884,826, filed Mar. 9, 1978, now U.S. Pat. No. 4,193,745, titled "Gear Pump With Means For Dispersing Gas Into Liquid," of which the present applicants are among the joint inventors and which is assigned to the same assignee as this application, there is disclosed a gear pump, again particularly suited for mixing a gas into a hot melt adhesive, wherein means are provided to further improve the uniformity of the output mixture. As taught in that application, the mixing means in one embodiment comprises a series of fixed shallow blind mixing cavities that open to the pumping chamber between the liquid inlet and the outlet and which are positioned to be "wiped" by the gear teeth as the respective gears rotate. The cavities may be positioned just downstream of the liquid inlet, between it and the respective gas inlet. Alternatively, the mixing cavities may be located further downstream, between the gas inlet and the outlet. In either case, the alternate connection and disconnection of the intertooth spaces to the mixing cavities as the gears rotate establishes motion or turbulence of the gas/liquid mixture within the intertooth spaces, and surprisingly improves the uniformity of the dispersion.

BACKGROUND OF THE INVENTION

As indicated above, it is well known in the art that gear pumps are useful for mixing a gas into a liquid. In all such gear pump mixers, a motor drive must be provided to rotate the gears within the gear chamber.

Such coupling of a motor and a gear pump is a relatively heavy and complex combination. These factors are not overriding or even particularly important for most applications, but in some instances it is desirable to mix a gas and liquid directly adjacent to a dispersing nozzle. In this instance the weight and size of a motor driven pump can be a disadvantage and a limitation, as for example where the mixer is to be located right at the nozzle or dispensing apparatus through which a hot melt adhesive foam is to be dispensed. The problem is especially acute if a mixer is to be provided in a hand held gun, because of the size and weight of the motor driven pump mixer. The problem again arises where a gas/liquid mixture is to be delivered from a mixer through a long hose to a nozzle, from which it is dispensed discontinuously with intermittent periods of inaction, for example overnight. During such quiescent periods the mixture in the hose may tend to separate and, when later dispensed, the separated gas may cause "spitting" or nonuniform delivery from the gun. Where this is a concern, the problem could of course be overcome by the provision of a return line, but that would require another length of heated hose.

In other instances, where the gas reacts with the liquid after mixing, it may be desirable to bring them together just upstream of the dispensing nozzle, so that the reaction cannot progress to an undesirable extent during the short period of travel to the nozzle.

As yet another example, where mixtures of different gases and liquids, or mixtures of different gas/liquid ratios, are to be supplied to separate nozzles, it is necessary to provide separate mixers (either adjacent a supply, or adjacent each nozzle) for accomplishing the separate mixings. The motor driven pumps previously available may be undesirably expensive for some applications.

Against this background, it has been the primary objective of this invention to provide mixing means, which are relatively lightweight, simple and less expensive, in comparison to gear motor-pump mixers, and which can be used adjacent a dispenser nozzle.

BRIEF DESCRIPTION OF THE INVENTION

It has been discovered by the present applicants that mixing of a liquid and a gas can be achieved in a simple manner by means which do not require the provision of a gear pump, and which in fact do not require the provision of a motor drive at all.

More particularly, it has been found that the mixing can be achieved with intermeshing gears which are not driven by a motor, but which are rotated in a gear chamber by the action of fluid under pressure applied thereto, with the gas and liquid being introduced through separate inlet ports, spaced apart by one or more gear teeth. The gears are not driven mechanically; they are driven by the action of the fluids themselves, in a manner which achieves the mixing.

Previous gear mixers have constituted pumps because they convert mechanical energy into hydraulic energy; they are motor driven and deliver fluid under higher pressure than inlet pressure. The present device, in contrast, constitutes what may be called a gear motor, or a motor/mixer, because it converts the fluid pressure of the incoming fluid into rotary motion of the gears.

The great advantage of the present mixing device, in comparison to a pump mixer, is that it is quite small and can readily be incorporated adjacent a nozzle, even in a hand held gun. Since by its use the mixing can be achieved adjacent to the nozzle rather than at the upstream end of a hose or conduit that feeds the nozzle, the mixture is prepared only as it is needed, immediately prior to dispersing from the nozzle; therefore the quantity of mixed fluid between mixer and nozzle is minimal, and use of a return line may be rendered unnecessary.

In a gear pump it is desirable to introduce the liquid first, at the point where the gears are just coming out of mesh, and then to introduce the gas through one or more separate ports downstream, to achieve better homogeneity. In a pump, the liquid is introduced first, at a rate which only partially fills the respective intertooth space. The gears are driven by the motor so that the intertooth spaces are moved beyond the inlet before the liquid, entering at metered rate, can completely fill each space (if an intertooth space were completely filled, no room would remain in it for the gas). The gas is delivered downstream to fill the remainder of the intertooth space at a desired gas/liquid ratio.

The porting arrangement just described, which is so desirable for a motor driven pump, is undesirable if no drive is used, that is, if the gears are allowed to "free wheel" in response to the pressure of incoming fluid. However, it has now been found that those disadvantages can be avoided if the gas and liquid ports are reversed. Particularly good results are achieved if provision is made to insure that the gas and liquid enter the intertooth spaces in constant proportion, irrespective of gear speed.

In the gear/motor mixer of this invention the gas is introduced into the intertooth spaces at a first end of the meshing zone, before the liquid is introduced; and the liquid is introduced downstream at a position separated from the gas inlet by one or more gear teeth.

If the liquid were introduced first, and the gas downstream, the incoming liquid would completely fill the respective intertooth spaces before the gas was admitted. The complete filling of the gear tooth spaces with liquid would itself cause gear rotation, and no gas would be received. Unlike a motor driven gear pump, no motor carries the respective spaces past the inlet before they are full; it is the rate of filling which itself determines rate of rotation. Thus, if the liquid was first let into the cavities, they would fill entirely with that liquid and they would already be full as they later passed a gas inlet downstream, and thus could accept no gas.

Surprisingly, however, if the gas is introduced first, this difficulty will not arise. The gas compresses to accommodate the higher pressure liquid when the liquid is introduced downstream.

The expansion of the gas in the intertooth spaces helps to rotate the gears, but absent some restraint or control this can lead to "overspeeding" of the gears; that is, the gears will be driven at a progressively increasing rate. This will progressively shorten the time span during which each intertooth space is in communication with the liquid inlet downstream, so that the amount of liquid that flows into each tooth space will gradually decrease, with a resulting increase in the gas/liquid ratio.

In order to overcome this effect, it has been found desirable to provide means regulating the quantity of gas which enters each tooth cavity as its passes the gas inlet, and thereby to prevent such overspeeding and maintain a constant gas/liquid ratio. According to one embodiment of this invention, this is done by providing gas flow "segmenting" or volumetric metering means in the gas supply line and which is defined in part by a series of differently angulated bores through the gear shaft and which rotate with the gear.

The invention can best be further described and explained by reference to the accompanying drawings, in which:

FIG. 1 is a front elevation, partly diagrammatic, of a three nozzle module for applying hot melt adhesive foam beads of different foam densities;

FIG. 2 is an enlarged vertical section taken on line 2—2 of FIG. 1, showing a preferred form of motor/mixer in accordance with the invention, mounted proximate to the nozzle;

FIG. 6 is a diagrammatic view of a motor/mixer in accordance with the invention, provided with an alternative form of fluid metering means in the gas and liquid supply lines.

Figure 3:
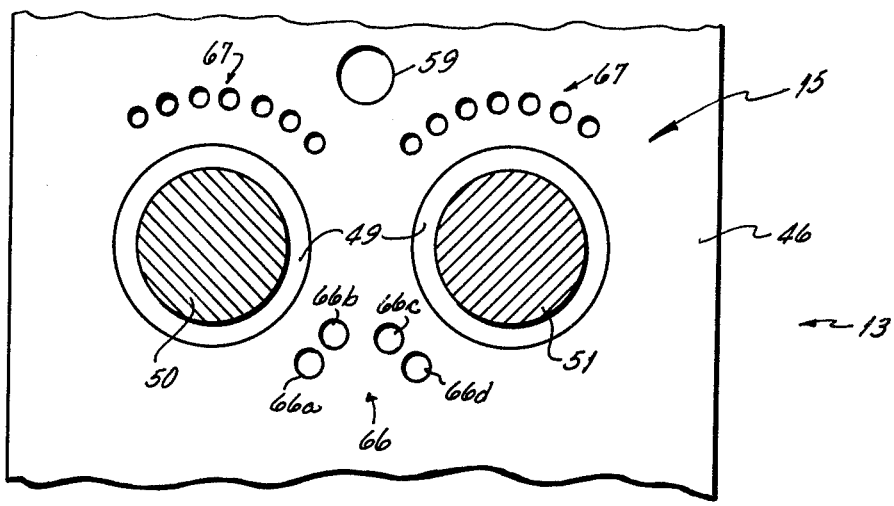
FIG. 3 is a horizontal section looking upward, taken on line 3—3 of FIG. 2.

The present invention arose in connection with the production of hot melt adhesive foams and for that reason it is described primarily in that environment. It should be noted, however, that it has utility for mixing a wide variety of other fluids.

FIG. 1 illustrates one common application for mixers in accordance with the invention, wherein three hot melt foam guns, designated at 10, 11 and 12 respectively, are mounted on a common manifold 13 in which one or more of the present motor mixers are housed. For purposes of explanation it is assumed that manifold 13 contains three separate motor mixers, one for supplying each gun, one of them being designated at 15 in FIG. 2 and supplying the centrally positioned gun 11. The motor mixers associated with guns 10 and 12 are not illustrated but may be similar to that illustrated in FIG. 2. Also, for purposes of description, the embodiment illustrated shows gun 11 as projecting a foam bead 16 onto a substrate S, flanked on either side by parallel beads 17 and 18 that are projected from guns 10 and 12. The central bead 16 is shown as being of lesser density and greater sectional area than the other beads 17 and 18, as a result of different gas/liquid ratios established by the separate motor/mixers.

All three motor mixers are fed from a common liquid hot melt source, as indicated at 20 in FIG. 1, through a pressure hose or conduit 21, and from a common gas source 22 (which may be bottle gas) via a gas supply line 23, through an adjustable gas pressure control valve 24. As shown in FIG. 2, the liquid is delivered under pressure by a pump 25 in line 21. (A suitable liquid pump for this purpose is shown in Scholl U.S. Pat. No. 3,964,645 for "Apparatus for Melting and Dispensing Thermoplastic Material.") The gas and liquid pressures used depend on the specific material and foam densities desired. As an example of pressures useful in making hot melt adhesive foams, the liquid may be supplied at a pressure in the range of 100 to 1000 psi. The gas is preferably at a lower pressure than the liquid, and is usually in the range of about 1 to 50 psi. However it should be understood that the gas pressure may be equal to or in excess of the liquid pressure.

The structure of gun and nozzle 11 (not including the motor mixer 15) may be conventional and does not comprise the invention. FIG. 2 shows a nozzle of the type shown in Baker et al U.S. Re. Pat. No. 27,865, issued Jan. 1, 1974, to which reference may be had for a more complete description. Briefly, the gas/liquid mixture is supplied to the nozzle from the motor mixer 15 through a line 26. Control air for actuating the nozzle to dispense the mixture is supplied from an external source through a passage at 28 to a cylinder 29 wherein it can act on a piston 30 to shift the piston rearwardly (to the left as seen in FIG. 2). The piston 30 is connected to operate a control rod 31 that is in turn connected to a nozzle valve element 32. When piston 30 is actuated, it moves element 32 away from the nozzle orifice 33. This opens a path for gas/liquid mixture to flow from passage 26 from mixer 15, out through the port 33 to be projected onto the workpiece or substrate S below (see FIG. 1) as the bead or line 16.

The details of the motor mixer itself are best shown in FIGS. 2-5. It includes intermeshing gears (two external or spur gears in the embodiment shown), designated respectively at 40 and 41, which are disposed in a gear chamber 42 formed within a gear plate 43. Gear chamber 42 is defined by two intersecting lobes 44 and 45. Gear 40 is supported for rotation in lobe 44 on a shaft 50, and gear 41 is supported for rotation in lobe 45 on a shaft 51. The teeth of the gears mesh in a meshing zone 52 where the lobes overlap, as indicated by dashed lines in FIG. 4.

Gear plate 43 is sandwiched in the manifold between a cap plate 46 on one side, on which the guns 10, 11 and 12 are mounted, and a body or block 47 on the opposite side. The cap, gear plate and body are secured together by suitable means not shown. The ends of shafts 50 and 51 are carried in bearings 49 in cap 46 and body 47, but as noted neither shaft is driven mechanically.

Figure 4:
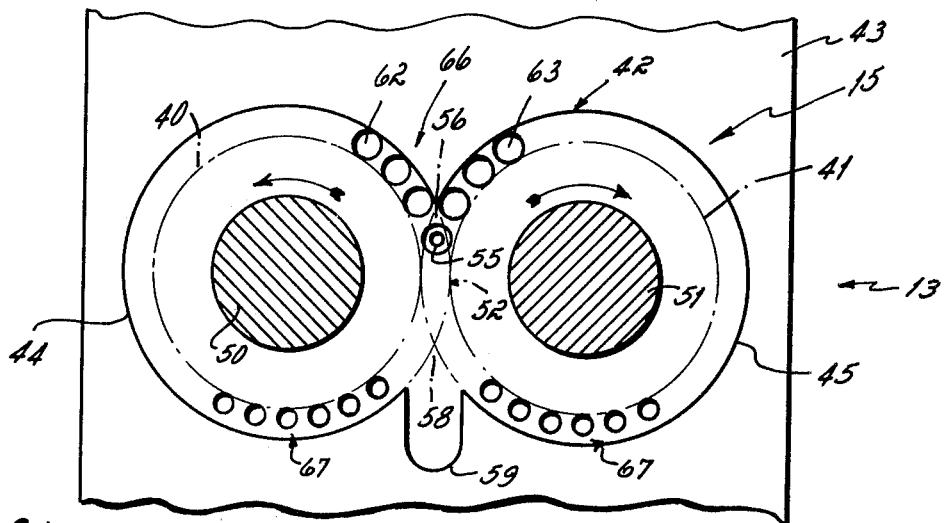
FIG. 4 is a horizontal section looking downward, taken on line 4—4 of FIG. 2.
Figure 5:
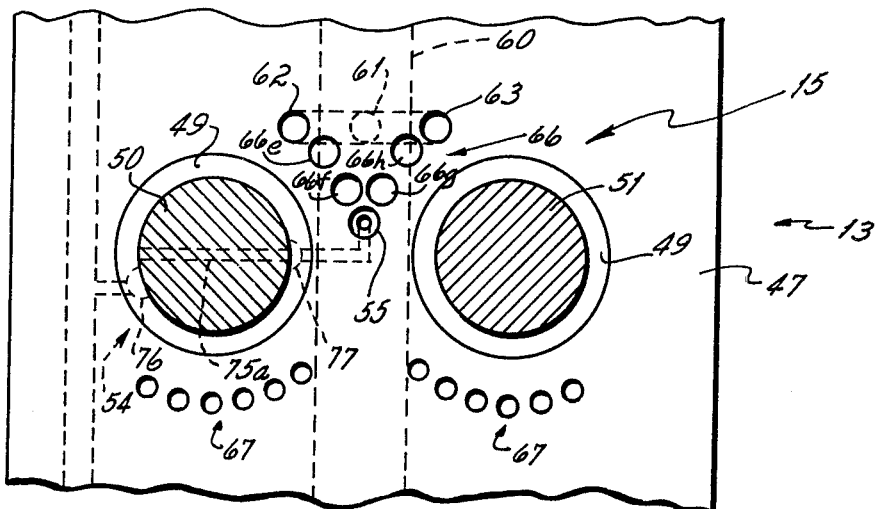
FIG. 5 is a horizontal section looking downward, taken on line 5—5 of FIG. 2.

Gas under pressure from gas source 22 via line 23 passes through a gas flow segmenting means 54, to be described, in body 47, and is introduced to gear chamber 42 through a gas inlet 55, see FIGS. 2, 4 and 5. Gas inlet 55 is adjacent a first end 56 of gear tooth meshing zone 52, and directs the gas into the space between adjacent teeth of the two gears.

As the gas flows from port 55 into an intertooth space at the first end 56 of mesh zone 52, where the space is partially filled by the tooth of the other gear, the gas expands and exerts a force on the teeth of the respective gears that tends to turn the gears in a direction to increase the volume of the intertooth space. This tends to cause the respective gears to rotate in the directions shown in FIG. 4, that is, left gear 40 rotates in the counterclockwise direction and right gear 41 rotates in the clockwise direction. Thus, in operation, the gear teeth come out of mesh at the first end 56 of the meshing zone 52, and they come together adjacent the second or opposite end 58 of the meshing zone. Adjacent the second end 58 of mixing zone 52, movement of the teeth of each gear into the intertooth spaces of the opposite gear displaces the fluid to an outlet 59 which connects with nozzle inlet 26.

The liquid (in this application, liquid hot melt) which is to be admixed with the gas in desired ratio, is introduced from liquid source 20 through pump 25 to a manifold line 60 in block 47, which in turn leads to a branch line 61 that feeds motor mixer 15. Line 61 leads to a pair of liquid inlets 62 and 63 which enter gear chamber lobes 44 and 45 respectively (see FIGS. 2, 4 and 5). It should be noted that these liquid inlets 62 and 63 enter the respective lobes at positions which are downstream, i.e., in the direction of gear rotation, from gas inlet 55 that is disposed centrally between them and that serve both lobes. The diameter of each liquid inlet 62 and 63 is preferably greater than the width of a single gear tooth, so as to overlap or "straddle" the tooth as it passes.

The liquid from inlet port 62 or 63, if under pressure greater than the gas, compresses the gas in each tooth cavity as it enters the intertooth space. The amount of liquid entering each space will depend, among other factors, upon the period of time the respective space is in communication with the liquid inlet 62 or 63; the more rapidly the gear moves past the liquid inlet, the smaller the quantity of liquid that will flow into each intertooth space. For this reason it is desirable, where uniformity of mixture is important, to maintain a constant rate of gear rotation while the nozzle is dispensing. This can be accomplished by the provision of gear speed regulating means. Preferably these means are in the form of the gas flow metering means 54 which has the affect of controlling speed, as is next described.

The means 54 acts as a flow "segmenting" device which releases only a precise predetermined volume of gas to each intertooth space as the space passes the gas inlet. The means 54 is formed in part by cross-bores in one of the gear shafts, through which cross-bores the gas must flow enroute to the respective intertooth spaces. More particularly, as shown in FIGS. 2 and 5, one gear shaft 50 includes a series of diametral bores, only three of which are shown for purposes of illustration, as designated at 75a, b, and c at axially spaced positions along the shaft such that the bores do not connect with one another. The number of bores is preferably half the number of intertooth spaces of the gear. The bores have different radial orientations, the angle between them substantially corresponding to the central angle between the adjacent gear tooth spaces. A narrow elongated bore inlet groove 76 is provided in body 47 extending parallel to the axis of the shaft and positioned so that as the shaft rotates, the ends of the respective bores 75 come sequentially into communication with it. A similar bore outlet groove 77 is formed on the other side of the shaft bore, but the grooves are misaligned with one another so that they do not both communicate with the same respective bore 75 at the same time. That is, there is never a continuous flow path from groove 76 through any bore 75, to outlet bore 77. The inlet groove 76 is in constant communication with gas supply line 23, and the outlet groove 77 leads to gas inlet 55.

It can be seen that for gas to enter the gear chamber, it must pass through one of shaft cross-bores 75. The sequential connection of the respective cross-bores 75 first with the inlet groove 76, then with the outlet groove 77, "segments" or chops the gas flow into discrete gas "pockets," which flow one at a time to the respective intertooth spaces. The volume of each bore 75 together with the passage between it and gas inlet 75, defines a pocket that contains a predetermined volume of gas which is fed only to a single geartooth space. The same segmented volume of gas is supplied to each space regardless of the rate at which the gears rotate, since the bores turn with the gears themselves. As a result, the regulated gas flow maintains in constant gear speed. This overcomes the previously mentioned "overspeeding" tendency of the gears to turn even more rapidly, and the attendant affect of progressively reducing the volume of liquid received in the gear tooth spaces as they pass the liquid inlets 62 and 63. (Another form of flow metering device is shown in FIG. 6, and is described subsequently.)

In order to achieve a still higher degree of uniformity of the mixture, it is preferable to supplement the motor/mixer structure with additional static mixing means. These are preferably in the form of a series of upstream, or inlet, mixing cavities as designated 66 in FIGS. 3–5, and/or a separate series of downstream, or outlet, mixing cavities as designated at 67. For maximum homogeneity, it is preferred to use both inlet and outlet mixing cavities 66 and 67, although either set alone, in the absence of the other, can provide an improvement.

The mixing cavities 66 and 67 have the same general characteristics as those described in the Hamilton et al application Ser. No. 884,826, now U.S. Pat. No. 4,193,745 previously identified, to which reference may be had. They comprise a series of shallow, blind cavities which may be formed by drilling or other means in the surfaces of cap plate 46 and block 47 which face gear chamber 42. The cavities are not connected to each other or to any other passage, other than to the gear chamber itself. They are spaced along the path of gear tooth movement so that they come into communication with the respective gear tooth spaces sequentially as the gears rotate.

First, taking up the inlet mixing cavities 66, these are provided in the form of a series of staggered or diagonally offset, spaced apart, shallow recesses or pockets, formed on the surface of cap 46 and the opposite surface of body 47. As shown in FIGS. 3-5, it is preferable to provide at least one such cavity on each element 46 and 47 for each lobe 44 and 45. The inlet cavities on cap 46 are designated at 66a–d in FIG. 3, and the inlet cavities on body 47 are designated as 66e–h in FIG. 5, the latter being spaced approximately equally along the arc between gas inlet 55 and the respective liquid inlet 62 or 63. The cavities 66a–d are centered half way between the positions of the cavities 66e–h, so that opposite cavities are staggered. The series of inlet cavities may continue on past the liquid inlets 62 and 63.

The included angle between adjacent cavities on the same side of the gear chamber should preferably be less than the included angle between adjacent gear teeth, preferably about two degrees less. The shape, size and exact positioning of the cavities 66 is not critical, but they should not provide a direct short circuit path from either liquid inlet back to the gas inlet.

The previously identified Hamilton et al application Ser. No. 884,826, teaches that the provision of such cavities in a pump is surprisingly effective as an aid to mixing. Here they are also effective, but for somewhat different reasons. Since the incoming liquid is usually at higher pressure than the gas already in the intertooth spaces, the incoming liquid from port 62 or 63 will flow into a tooth space and will create a pressure surge or fluctuation that is reflected upstream (toward the gas inlet), through the fixed cavity that straddles the following gear tooth. The pressure surge bleeding back from the liquid inlet across an intertooth space to a mixing cavity, to the next following intertooth space and so on, causes motion and turbulence within the respective intertooth spaces and promotes mixing. In effect it extends the area over which the gas and liquid are mixed, over the entire area between the gas and liquid inlets.

The downstream or outlet series of mixing cavities 67 preferably also include staggered recesses on each of the opposite faces that form the sides of the gear chamber. Generally speaking, more outlet cavities may be provided, and the series may extend over a greater arcuate distance, than the inlet cavities. Whereas the inlet cavities should advantageously be wide enough to straddle a gear tooth, the outlet cavities preferably should open only to a single intertooth space; that is, they should not straddle a tooth. By reason of the pressurized fluid in the intertooth spaces, as each intertooth space moves past a cavity of the outlet series, the fluid will tend to expand and displace fluid into the cavity, again with resulting mixing and turbulence.

As previously indicated, the size and positioning of such mixing cavities is not highly critical. By way of illustration of one embodiment and without limitation, in a motor/mixer having two 20-tooth gears with a diametral pitch of sixteen and a pitch diameter of 1.25", the centers of successive inlet cavities 66 (on the opposite elements 46 and 47) may be about 7° apart, as measured from the centers of the gears, so that the spaces between adjacent cavities on the same side is slightly less than the 18° spacing between adjacent gear teeth. The cavities may be formed by drilling, to have a conical shape about 0.030" deep and 0.140" diameter. In this example the outlet cavities 67 are preferably slightly smaller, about 0.030" deep and 0.086" in diameter, and at the same spacing as indicated above.

In the embodiment described above the motor/mixer 15 feeds the central gun and nozzle 11. Separate motor/mixers, to which gas is introduced at lower pressure, may be used to feed the guns 10 and 12 for example to apply foams of higher density than the bead 16. Other things being equal, the density of the foam will depend upon the pressure of the gas supplied. This can be set as desired by the adjusting valve 24.

An alternative method of preventing the "overspeeding" effect previously described, is shown diagrammatically in FIG. 6. There a gear motor/mixer, as already described but without gas metering means 54, is shown diagrammatically at 15. This mixer is provided with fluid flow proportioning means designated generally by 80, and including two additional gear motors 81 and 82 for metering the two fluids before they are delivered to the mixer 15. Gas is supplied from a pressure source through a pressure control valve to the motor 81, which comprises a pair of meshing, rotating gears 83 and 84 supported for rotation in a gear chamber, not shown. The gas is introduced to the meshing zone between the gears 83 and 84 through a port at 85, causing them to rotate in the direction shown by the arrows, and is delivered to an outlet port at 86 and a delivery line 87. Thus the gas rotates the gears 83, 84 as it flows through the metering motor 81. The second metering motor 82 is similar, having meshing gears 88 and 89. It is fed from a liquid supply line 90. The flow of liquid through the motor meter 82 rotates the gears 88 and 89. The two devices 81 and 82 are coupled mechanically as indicated diagrammatically by the dashed line 91 between gears 84 and 89, so that they rotate in synchronism. By this means the ratio of the rates of gas and liquid flow through the respective meters is constant. The outlet 92 of motor 82 is connected to the outlet 87 of motor 81, and the gas and liquid are brought together in a common inlet line 93 which leads to the central inlet 55 of motor mixer 15. Since the gas and liquid are introduced together, no overspeed of motor/mixer 15 can occur. By use of the two interconnected fluid metering means as shown in FIG. 6, the motor/mixer 15 can be used to mix two liquids, as well as a gas and a liquid.

While the invention has been described in the foregoing specification with the mixer located directly adjacent to a dispenser nozzle, those skilled in the art will recognize that the mixer can be located more remotely from the nozzle, if desired. Because of the relative simplicity of the mixer, its use may be advantageous from a price standpoint, apart from its small size and weight.

While the invention has been described herein in preferred form and in alternative embodiments, it will be understood by those skilled in the art that it is not limited to those particular forms, but includes other embodiments and modifications falling in the scope of the claims which follow:

We claim:

1. Gear motor apparatus for mixing a liquid under pressure with a gas under pressure, comprising,
   a body having a gear chamber,
   intermeshing gears mounted for rotation in said chamber, said gears having teeth which interengage in a meshing zone of said chamber,
   a gas inlet entering said chamber adjacent a first end of said meshing zone,
   an outlet communicating with said chamber adjacent a second end of said meshing zone,
   a liquid inlet entering said chamber at a position which is spaced downstream from said gas inlet and upstream from said outlet,
   there being no motor drive for rotating said gears, the gears being rotated by the pressures of the incoming fluids.

2. Apparatus for dispersing a gas in a liquid directly proximate to a dispensing nozzle, comprising,
   a source of gas under pressure,
   a source of liquid,
   a gear motor/mixer comprising,
   a body having a gear chamber,
   intermeshing gears mounted for rotation in said chamber, said gears having teeth which interengage in a meshing zone of said chamber,
   a gas inlet entering said chamber adjacent a first end of said meshing zone,
   an outlet communicating with said chamber, adjacent a second end of said meshing zone, and
   a liquid inlet entering said chamber at a position which is downstream from said gas inlet and upstream from said outlet,
   said gears being rotated in said chamber by the expansion of such fluid in the spaces between the gear teeth,
   means mounting said motor/mixer adjacent to said nozzle,
   passages connecting said gas source and said liquid source with the gas and liquid inlets respectively of said motor/mixer, and
   a passage connecting the outlet of said motor/mixer to said nozzle.

3. The apparatus of claim 1 or 2 further including means for establishing a constant rate of rotation of said gears.

4. The apparatus of claim 3 wherein said means for establishing a constant rate of rotation of said gears comprises means providing a predetermined volume of gas through the gas inlet into the respective spaces between the teeth of the gears, which volume is constant and independent of the rate of gear rotation.

5. The apparatus of claim 1 or 2 further including a shaft rotated by one of said gears, a series of axially spaced bores through said shaft at different angular positions corresponding to the relative angular positions of the spaces between the teeth of said gears,
   a first passage in said body communicating with first ends of said bores in sequence as said shaft turns,
   a gas supply line leading to said first passage,
   a second passage in said body communicating with second ends of said bores in sequence as said shaft turns,
   said first and second passages being so positioned in said body that when the first end of a bore is in communication with said first passage the second end of that bore is not in communication with said second passage,
   means connecting said second passage to said gas inlet,
   the sequential communicaton of said bores first with said first passage, then with the second passage, segmenting the flow of gas in said supply line and providing a predetermined volume of gas to each intertooth space of said gears, independent of the rate of gear rotation.

6. The apparatus of claim 1 or 2 further including a series of blind cavities opening to said chamber,
   said cavities at spaced positions along the path of movement of the teeth of at least one of said gears,
   the intertooth spaces of said gear alternately connecting to and disconnecting from the cavities in sequence as the gear rotates.

7. The apparatus of claim 6 further wherein at least two such cavities open to said chamber between said gas inlet and said liquid inlet.

8. The apparatus of claim 7 wherein said two cavities are wider than the gear teeth, so as to straddle the tooth as it passes, and thereby permit liquid introduced at said liquid inlet to move toward said gas inlet.

9. The apparatus of claim 6 further wherein said series of cavities is spaced from the gas and liquid inlet and is adjacent said outlet.

10. The apparatus of claim 6 further wherein said series of cavities is between the gas and liquid inlets.

11. The apparatus of claim 6 wherein said cavities are shallow drill holes.

12. The apparatus of claim 1 or 2 wherein a first series of said cavities is located between the gas and liquid inlets and wherein a second series of said cavities is spaced from said first series and is located adjacent said outlet, said first and second series of cavities being spaced circumferentially from each other along the path of movement of the gear teeth so as not to present a continuous series of cavities extending from the inlets to the outlet.

13. The apparatus of claim 2 wherein said nozzle is mounted on said motor/mixer.

14. The apparatus of claim 2 including a plurality of such nozzles, each having a separate such motor/mixer supplying it, to provide different gas/liquid mixtures from the nozzles.

15. The apparatus of claim 14 wherein said nozzles and mixers are all mounted together as a module.

16. The apparatus of claim 2 wherein said last named passage is short in length so that the gas/liquid mixture from the outlet of said motor/mixer is delivered to said nozzle immediately upon leaving said outlet.

17. The apparatus of claim 2 wherein said source of liquid is a source of molten hot melt adhesive.

18. Apparatus for mixing two fluids under pressure comprising, a pair of gear motors, each having an inlet and an outlet, means interconnecting a gear of each said motor with a gear of the other motor so that the pair of motors rotate in synchronism, means for supplying one of said two fluids under pressure to the inlet of one of said pair of motors, means for supplying the other of said two fluids under pressure to the inlet of the other of said pair of motors, a passage connecting the outlets of both said pair of motors to the inlet of a third gear motor, said third gear motor being rotated by pressure of said fluids acting on the gears thereof and mixing said fluids as they are delivered to the outlet thereof.

19. Gear motor apparatus in which a gas and a liquid are intermixed by the action of meshing gears in a gear chamber and the mixture is delivered to an outlet port where the teeth of the gear come into mesh, said gear motor having mixing means for improving the dispersion of the gas in the liquid, said mixing means comprising, a series of blind cavities formed in a surface which adjoins said chamber, said cavities opening to said chamber, said cavities being at spaced positions along the path of movement of the teeth of at least one of said gears such that the cavities are separated by gear teeth, the intertooth spaces of said gear alternately connecting to and disconnecting from the cavities in sequence as the gear rotates.

20. The apparatus of claim 19, said cavities being formed as shallow recesses in the surfaces which define said chamber in positions to be swept by the gear teeth as they move toward said outlet, the respective cavities being alternately opened and closed from the intertooth spaces by the gear teeth as the teeth move sequentially past them in operation.

21. The apparatus of claim 20 further wherein adjacent cavities in said series are spaced apart by approximately the width of a gear tooth, so that said gear tooth restricts flow through them.

22. The apparatus of claim 21 further wherein the cavities are formed in an element which closes said chamber on one side of the gears therein.

23. The apparatus of claim 21 further wherein said cavities are formed in two opposite elements which close said chamber on opposite sides of said gears.

24. The apparatus of claim 23 wherein the cavities in one of said opposite elements are staggered with respect to the cavities on the other said element.

25. Gear motor apparatus operated by pressure of incoming fluids, for mixing a liquid under pressure with a gas under pressure, comprising, a body having a gear chamber, intermeshing gears mounted for rotation in said chamber, said gears having teeth which interengage in a meshing zone of said chamber, a gas inlet and a liquid inlet entering said chamber, and an outlet communicating with said chamber, said gears being rotated in said chamber by fluid expansion in the spaces between the gear teeth.

* * * * *